(12) United States Patent
Finley et al.

(10) Patent No.: US 7,352,317 B1
(45) Date of Patent: Apr. 1, 2008

(54) DATA COMPRESSION SYSTEM AND METHOD FOR A WEATHER RADAR SYSTEM

(75) Inventors: Jeffery A. Finley, Cedar Rapids, IA (US); Bryan L. Jurgensen, Cedar Rapids, IA (US); Roy E. Robertson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 115 days.

(21) Appl. No.: 11/159,458

(22) Filed: Jun. 23, 2005

(51) Int. Cl.
*G01S 13/89* (2006.01)
*G01S 13/95* (2006.01)

(52) U.S. Cl. .................................................. 342/26 B
(58) Field of Classification Search ................ 342/26, 342/26 B, 26 R
See application file for complete search history.

(56) References Cited

U.S. PATENT DOCUMENTS

| | | | | |
|---|---|---|---|---|
| 4,520,506 A | * | 5/1985 | Chan et al. ................ | 382/242 |
| 5,135,397 A | * | 8/1992 | Yen ................................ | 434/2 |
| 5,198,819 A | | 3/1993 | Susnjara | |
| 5,363,107 A | * | 11/1994 | Gertz et al. ................ | 342/26 B |
| 5,661,477 A | * | 8/1997 | Moreira et al. ................ | 341/50 |
| 5,945,926 A | | 8/1999 | Ammar et al. | |
| 6,236,351 B1 | * | 5/2001 | Conner et al. ............ | 342/26 B |
| 6,388,608 B1 | | 5/2002 | Woodell et al. ............... | 342/26 |
| 6,614,425 B1 | * | 9/2003 | Burdon ........................ | 345/418 |
| 6,828,922 B1 | * | 12/2004 | Gremmert et al. .......... | 340/949 |
| 7,039,505 B1 | * | 5/2006 | Southard et al. .............. | 701/3 |
| 2006/0145912 A1 | * | 7/2006 | Mekkapati et al. ........ | 342/26 R |

* cited by examiner

*Primary Examiner*—Thomas Black
*Assistant Examiner*—Shelley Chen
(74) *Attorney, Agent, or Firm*—Nathan D. Jensen; Kyle Eppele (57) ABSTRACT

A method of compressing data in a weather radar system utilizes a compression system. Weather radar data associated with graphical images provided on a weather radar display is compressed for downloads or downlinks from the airplane or storage on the airplane. The weather radar data can be compressed from any part of the process. In one embodiment, spatial resolution of the data is decreased while data resolution is increased.

9 Claims, 6 Drawing Sheets

DATA COMPRESSION SYSTEM AND METHOD FOR A WEATHER RADAR SYSTEM

FIELD OF THE INVENTION

The present application relates to weather radar systems. More particularly, the present application relates to data compression methods and systems for use in weather radar systems.

BACKGROUND OF THE INVENTION

Conventionally, pilots use weather radar systems to detect and avoid hazardous weather. Weather radar systems typically include a radar antenna which transmits radar signals and receives radar returns. The radar returns are processed to provide graphical images to a radar display. The radar display is typically a color display providing graphical images in color to represent the severity of weather. Conventional weather radar systems includes those manufactured by Rockwell Collins, Inc. and Honeywell International, Inc. and others.

Most conventional weather radar displays require a vast amount of digital storage capability. For example, raw quadrature data (I, Q data) digitized from radar returns can require approximately 4.9 megabytes for each four second scan. According to an ARINC 453 standard, the raw quadrature data is processed into a smaller data stream that is used to provide graphical images on weather display. The data stream of the ARINC 453 standard requires approximately 140,000 bytes to store each 4 second scan. Accordingly, the vast quantity of data associated with radar scans makes real time, data storage during flights difficult. This difficulty may be enhanced as radar techniques became more sophisticated and process even more data.

Further, the large amount of data associated with weather radar systems makes long-term storage of such data and/or downlink transmissions of such data nearly impossible. As a result, post-flight evaluation of radar performance must often be conducted based upon pilot memory and conjecture rather than recorded weather radar data. For example, if an aircraft experiences a weather pattern which is not indicated on the display, the pilot must mentally remember what was on the display at the time of the weather pattern.

Conventional weather radar systems do not include a mechanism for storing the weather radar data or even the graphical images provided to the pilot on the display. Having weather data for post flight analysis would be helpful in assessing any unusual weather encounters experienced by the flight crew. In addition, this data could be transmitted to ground based personnel for dissemination to other aircraft or could be transmitted directly to other aircraft. According to another example, if an aircraft experiences lightning, a wind shear event, a sudden gain or drop in altitude due to weather or other event, it would be desirous to store data associated with the weather radar display at the time of the event.

Thus, there is a need to provide a system and/or method that allows weather radar data to be stored in response to an event. Further still, there is a need for a system and/or method that compresses data to a more manageable size. Yet further, there is a need to store data or download data that reflects the graphical images provided to a pilot on a weather radar display. Even further still, there is a need for a system and/or a method that reduces the amount of data required to provide an approximation of the graphical images on a weather radar display. The teachings disclose the extent to those embodiments which fall within the scope of the appended claims regardless of whether they accomplish one or more of the aforementioned needs.

SUMMARY

According to one exemplary embodiment, a method of compressing data in a weather radar system includes receiving an indication of an event in an aircraft weather radar system. The method also includes compressing weather radar data associated with graphical images provided on a weather radar display. The weather data is in response to weather radar returns. The compressing creates a compressed data form of the original graphical image. The method also includes storing the compressed data.

Another exemplary embodiment relates to a method of compressing data for a weather radar system. The method includes receiving first data used to provide graphical images associated with graphical data to be displayed on a display of the weather radar system. The first data represents radar returns at areas or volumes. The method also includes grouping selected areas or volumes together and performing at least an averaging function to provide second data. The second data being compressed at a ratio of at least 200:1 when compared to the graphical data.

Still another exemplary embodiment relates to an airborne weather radar system. The airborne weather radar system includes a radar antenna attached to the aircraft, and a processing system. The processing system receives weather radar returns from the radar antenna system. The processing system compresses radar data associated with graphical images provided on the display. The graphical images are provided in response to the weather radar returns. The radar data is compressed to provide compressed data. The compressed data has reduced spatial resolution when compared to the radar data.

BRIEF DESCRIPTION OF THE DRAWINGS

Exemplary embodiments become more fully understood from the following detailed description, taken in conjunction with the accompanying drawings, wherein like reference numerals refer to like elements, and.

DETAILED DESCRIPTION OF PREFERRED AND EXEMPLARY EMBODIMENTS

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
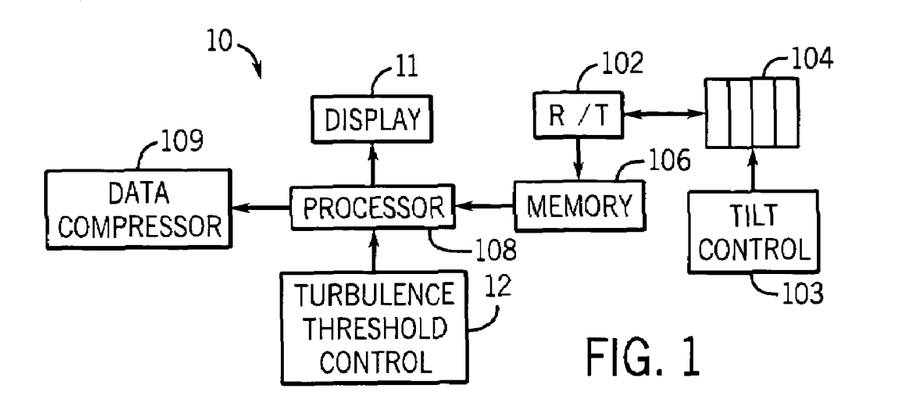
FIG. 1 is a general diagram of an airplane having a weather radar system and flying in the atmosphere.

With reference to FIG. 1, a weather radar system 10 similar to a system described in U.S. Pat. No. 6,388,608 includes a display 11, a processor 108, a turbulence threshold control circuit 12, a data compressor 109, a receiver and transmitter circuit 102, an antenna 104, and a tilt control system 103. A manual antenna tilt control system 103 is included for manually controlling the tilt angle of the antenna by the pilot. System 103 is generally used by a pilot to manually adjust the tilt angle.

Display 11 can include an additional signal scan smoothing memory, such as memory 106. Memory 106 is used to store one scan and limit the display of radically different data on the next sweep which is done at the same tilt angle.

Tilt control circuit 103 can also be an automated tilt control circuit controlled by processor 108. Various automated tilt control systems can be utilized to adjust the position of antenna 104.

Processor 108 is preferably a weather radar return processing unit used to calculate standard deviations of wind velocities, to generate turbulence alerts, and to provide a display signal to display 11. Preferably, display 11 provides a graphical representation of radar returns received by processor 108. Display 11 preferably provides color graphical images corresponding to the intensity of the radar return. The graphical images can represent weather regions, rainfall densities, turbulence regions, etc.

In a preferred embodiment, display 11 is a color display that receives an ARINC 453 data stream. According to the ARINC 453 standard, each point is represented by 3 bits of color data allowing 8 total data values per point. The data is typically generated as a sequence of radials emanating from the aircraft location and spanning 180 degrees of azimuth. Generally, 512 points are generated along each radial and the radials are generated each 0.25 degrees. Thus, for a 180 degree scan, 368640 data points are generated (512*(180/0.25)). Other display interfaced standards such as ARINC 661 may also be used.

Processor 108 is advantageously coupled to data compressor 109. Data compressor 109 can compress weather radar associated with the graphical data used to provide graphical images on display 11. Preferably data compressor 109 compresses the data at a ratio of at least 2:1, (preferably at least 20:1, more preferably at least 200:1, most preferably 500:1), when compared to the graphical data. Data compressor 109 can be located within processor 108 or external to processor 108.

The details about system 10 are provided in an exemplary fashion. The principles of the present application are applicable to any weather radar system utilizing radar data for a display. The type of data, format of its storage, and size of data are not described in a limiting fashion unless specifically recited in the claims. The various components and circuits described below can be implemented in almost any hardware or software configuration depending upon design parameters and system criteria.

According to another embodiment, data compressor 109 can provide the compressed data to display 11. In this way, the pilot can view the compressor data which may have greater data resolution (although it may have less spatial resolution). According to another embodiment, compressed data from storage can also be provided on display 11 for viewing by a pilot or other personnel.

Figure 2:
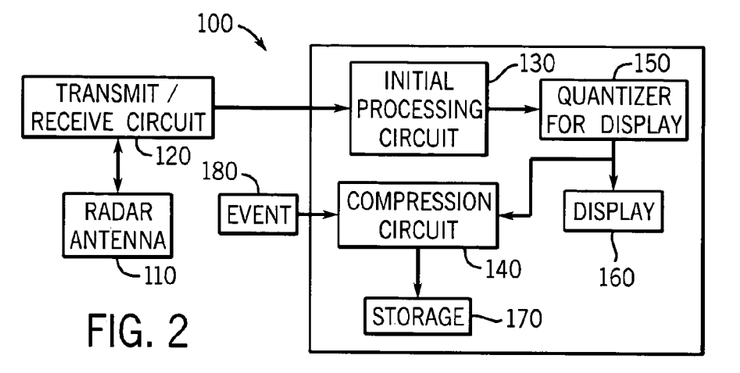
FIG. 2 is a general block diagram of a weather radar system in accordance with a first exemplary embodiment.

With reference to FIG. 2, system 100 is similar to system 10 and includes components similar to system 10. System 100 includes radar antenna 110 similar to antenna 104, display 160 similar to display 11, transmit receive circuit 120 similar to circuit 102, and compression circuit 140 similar to data compressor 109.

System 100 also includes initial processing circuit 130, quantizer 150, compression circuit 140, storage 170 and event circuit 180. Circuits 130, 140, 150, display 160 and storage 170 are preferably part of weather radar system 100 or processor. Alternatively, storage 170 can be located outside of weather radar system 100.

Weather radar returns from antenna 110 are provided to transmit receive circuit 120. Transmit receive circuit 120 provides radar data to initial processing circuit 130. Initial processing circuit 130 receives digitized antenna data from circuit 120. Circuit 130 processes the data to generate information for weather range, weather intensity, weather velocity, and weather turbulence. This information is combined, filtered, and processed in internal memory storage at high resolution. The high resolution data is provided to quantizer for display 150. Any of these intermediate data products is a candidate for data compression.

The radar data is provided for eventual graphical display on display 160. Preferably, the graphical images are displayed on display 160 in accordance with ARINC standard 453, although the present invention is not limited to the ARINC 453 standard. The radar data is also provided to compression circuit 140.

Compression circuit 140 operates to compress the data from quantizer circuit 150. The compressed data can be provided to storage 170. Storage 170 can be nonvolatile memory or volatile memory. In one embodiment, storage 170 is a flash EE PROM, a hard disk drive, or other storage device. In another alternative embodiment, storage 170 is a DRAM. Storage 170 can be located in a different part of the aircraft than the weather radar system 100. The compressed data can be downloaded off the airplane either directly from compression circuit 140 or through a download from storage 170.

Alternatively, compression circuit 140 can store the compressed data in memory associated with the hardware platform for system 100. The memory can be a DRAM, flash memory, or other storage. The memory can be memory associated with circuit 130, digital signal processors, etc.

In an alternative embodiment, compression circuit 140 can be provided to a flight data recorder or other storage device separate from weather radar system 100. Preferably, compression circuit 140 provides reduction in data storage requirements such that the data can be downlinked via ACARS or other means to allow real time, ground based weather evaluation or storage in storage 170. In one embodiment, the compressed data is downlinked via ACARS in real time to allow coordination with other weather data products such as NEXTRAD and satellite images. The compressed data can also be disseminated to other aircraft either via ground link or directly.

In one embodiment, compression circuit 140 provides compression in an almost 500 to 1 reduction ratio. In other embodiments, the compression algorithm can be configured to have reduction ratios of at least 200 to 1. Preferably, compression circuit 140 has sufficient spatial resolution to distinguish storm cells and other display features at intensity levels similar to those seen by the pilot on display 160 at full resolution. Spatial resolution of the image is reduced to achieve data compression. However, data resolution of the image can actually be higher than that seen by the pilot.

In FIG. 2, higher data resolution may not be achieved if the data stream is tapped as it goes directly to display 160. For this particular embodiment, the data resolution is limited to the resolution of the data stream to display 160.

Higher resolution allows evaluation of display thresholds and subtle storm features. Preferably, the weather radar data is provided through initial processing circuit to quantizer circuit 150 to display 180. The radar data is provided as an ARINC 453 data stream (e.g., graphical data) to display 160. In the embodiment shown at FIG. 2, compression circuit 140 receives the radar data as it is provided from quantizer circuit 160 to display 180.

Advantageously, applicants have found that in post-flight analysis and evaluation, high spatial resolution associated with the display is not as critical. Applicants have found that one embodiment of the data compression methodology advantageously reduces the spatial resolution to achieve lower storage requirements. Advantageously, compression circuit 140 groups high resolution data into patches and statistically combines the data to generate a single representative data product for the entire patch.

With reference to FIG. 2, compression circuit 140 can be configured to compress in response to an event. The event can be a timing event (once every several minutes or hours) or it can be a specific external event. In one embodiment, weather radar system 100 includes a user interface with allows a pilot to press a button or provide other inputs such that the radar data is compressed and stored in response to a pilot's action. In another embodiment, event circuit 180 can be coupled to other navigation equipment to cause system 100 to compress and store data in response to certain geographical landmarks or changes in aircraft positioning. For example, event circuit 180 can be utilized to provide compression and allow circuit 140 to provide compression and storage in response to a change in altitude of the airplane, such as a drastic increase or drop in altitude. In another embodiment, event circuit 180 can be coupled to other weather or warning equipment and can provide compression and storage in the event of lightning strikes near the airplane or in the event of wind shear detection.

Event circuit 180 can also cause compression in response to turbulence. In one embodiment, if the aircraft experienced turbulence of at least 0.1 g, the weather data is stored. Alternatively, if weather radar system 200 detects turbulence at a distance of 25 nautical miles, weather radar data is compressed and stored. Another feature of the system 100 is that it buffers data. If in situ turbulence is detected via the aircraft inertial sensors then the buffered data, corresponding to 25 miles of previous sweep data, is compressed and stored so that the performance of system 100 on the approach to the turbulent event can be evaluated.

In yet another embodiment, event circuit 180 is programmed in the event of a wind shear event or other event to record data in a window around the wind shear event. Compression circuit 140 can be configured to continually compress data at an interval (e.g., 1 second) in one embodiment and hold that data for a fixed period of time (e.g., 16 seconds). If a wind shear or other event has not occurred, the data is discarded. However, if a wind shear or other event occurs, the 16 seconds surrounding the wind shear event would be stored in storage 170 along with a time at which the event occurred. Preferably, storage 170 includes a time stamp indicating when the event occurred and/or when data compression and/or storage occurred.

In a preferred embodiment, data compression circuit 140 (FIGS. 2-4) and data compressor 109 (FIG. 1) are implemented in a software subroutine. The subroutine can be executed on a digital signal processor associated with system 100. In one embodiment, system 100 uses a hardware platform such as a WXR-2100 weather radar system manufactured by Rockwell, Collins, Inc. or an RDR 4000 weather radar system manufactured by Honeywell, International, Inc. However, the present invention is not limited to any type of hardware platform.

Figure 8:
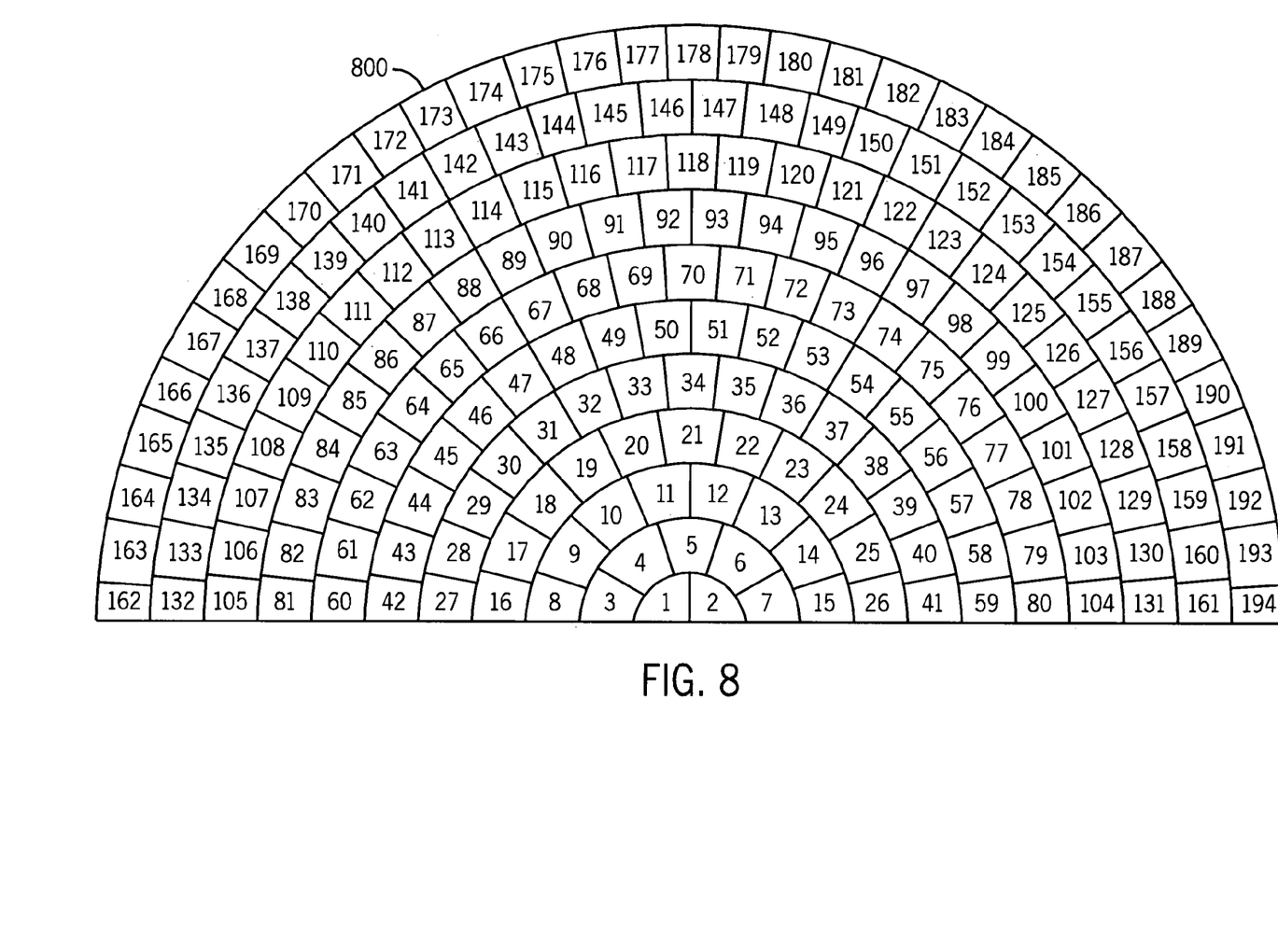
FIG. 8 is a general block diagram showing a scan pattern for the compression algorithm used by any of the systems in FIGS. 2-5.

With reference to FIG. 8, data compression circuit 140 preferably receives the radar data and groups the radar data into areas or volumes as represented in an array 800. Array 800 is made of blocks numbered from 1 to 194. Preferably, each block has an approximately equal volume or area as shown in FIG. 8.

Blocks of array 800 are preferably staggered as advances are made through rows in the radial direction. For example, the division between blocks 1 and 2 is in the middle of block 5 and the division of blocks 11 and 12 is also in the middle of block 5. Applicants have empirically found that the particular pattern shown in array 800 provides sufficient spatial resolution to distinguish storm cells. Circuit 140 preferably performs a statistical methodology or algorithm for combining high resolution data points into a single data point for each block or patch in array 800.

In one embodiment, an average-based algorithm is utilized by circuit 140. Based upon empirical analysis, a combination algorithm equal to the average of each data point in each patch or block plus two times the standard deviation is utilized.

$$Block = (\Sigma g_i)/N - 2[STD]$$

where the summation is from i=1, to N (where N is the number of points in each block and $g_i$ refers to the radar data at each point.) STD refers to the standard deviation. Other algorithms can be utilized including filters, decimators, etc. for compressing the data. Additional compression can be performed on the compressed data.

The radar data is preferably 3 bits of data resolution per point according to the ARINC 453 color encoding scheme. Although such a scheme is adequate to allow a pilot to rapidly assess weather threat on a display, applicants have found it is more advantageous to have higher data resolutions to allow engineering evaluation of radar performance and subsequent pilot actions in a post-flight environment. As a result, instead of a total of 3 bits of ARINC 453 data, the compressed data is formed to a total of 4 bits of data stored per group to represent reflectivity (radar returns, i.e., full intensity).

Four bits can also be stored to represent turbulence threat detection. Turbulence data is normally encoded into the ARINC 453 data stream as the color magenta, i.e. it is one of the 8 colors allowed by the 3 bits of ARINC 453. System 100 generates its data products, i.e. intensity, velocity, and turbulence at much higher resolution. These additional data products can be compressed and stored to allow post processing at higher data resolutions than allowed by the ARINC 453 data stream.

Figure 5:
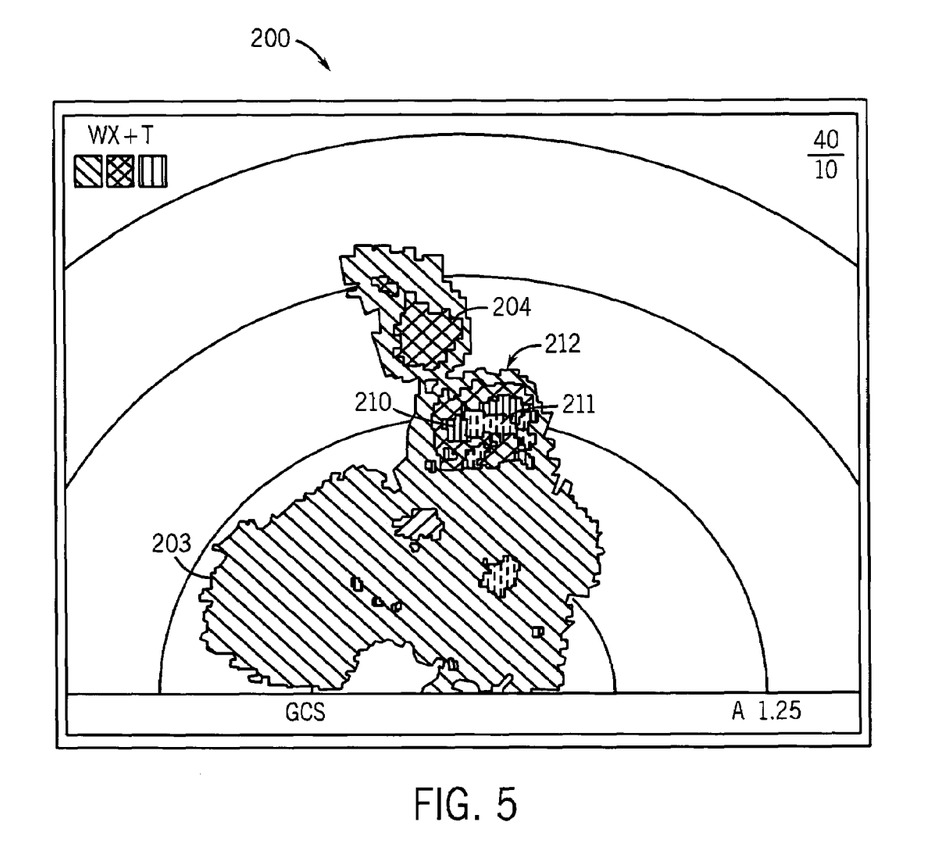
FIG. 5 is a screen shot showing a weather radar display for any one of the systems illustrated in FIGS. 2-5.

With reference to FIG. 5, a screen shot for display 160 or display 11 is shown and includes weather of various intensities. Region 203 represents a green portion on a black background, and region 204 represents a yellow portion on a black background. In addition, screen shot 200 includes regions 211 that are magenta portions corresponding to turbulence regions. Region 210 corresponds to red portion on a black background.

Figure 6:
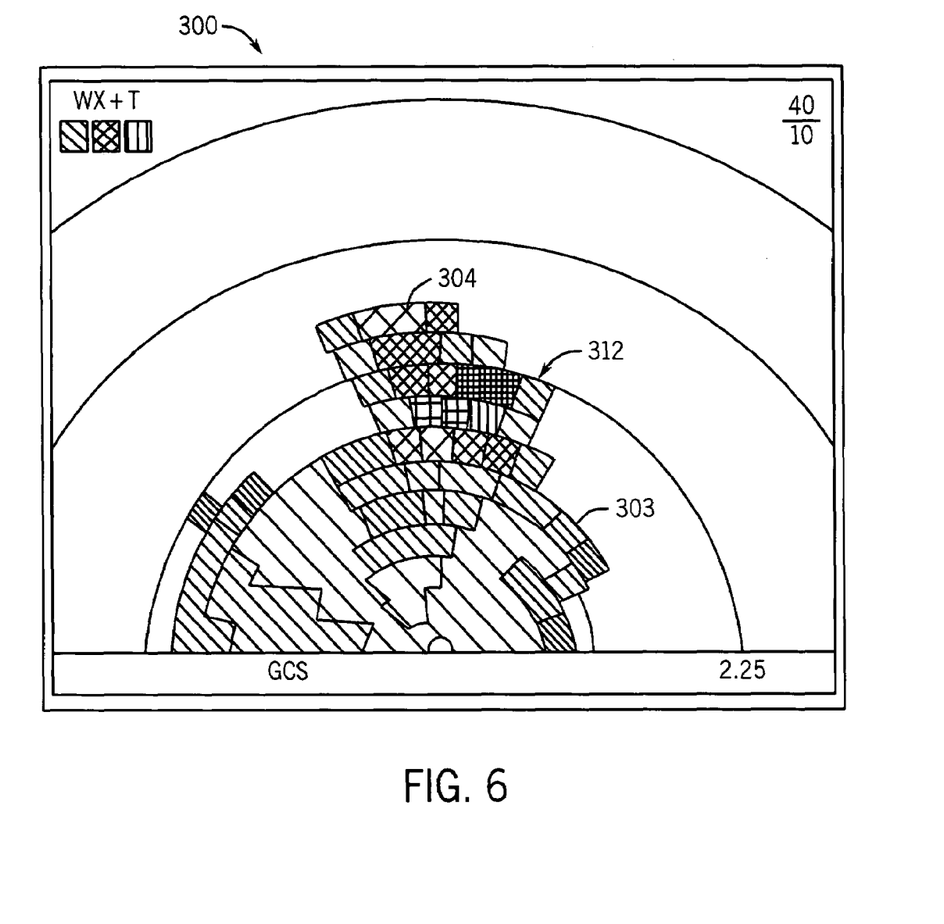
FIG. 6 is a screen shot showing compressed data from any of the systems illustrated in FIGS. 2-4.

Data compression circuit 140 operates to compress the data used to provide the graphical images on screen shot 200. The compressed data is shown on a display as screen shot 300. Screen shot 300 shows weather intensity. Turbulence data is not encoded in screen shot 300. Screen shot 200 includes a total of 4 colors for graphical images (magenta (not shown since turbulence is not depicted), red, yellow and green), and screen shot 300 includes 16 color levels. Shading in the green, yellow and red colors is used to show higher data resolution. Region 312 corresponds to region 212, region 304 corresponds to region 204, and region 203 corresponds to region 303. Preferably, screen shot 300 utilizes the average plus 2 sigma algorithm to combine pixels into reduced spatial areas.

Screen shot 300 corresponds to compressed rainfall data associated with the display images on screen shot 200. The compressed rainfall data shows substantial intensity similarity to the full resolution data except subtle graduations in the intensity level are actually more prominent in the compressed data due to the increase in data resolution from 3 to 4 bits.

Figure 7:
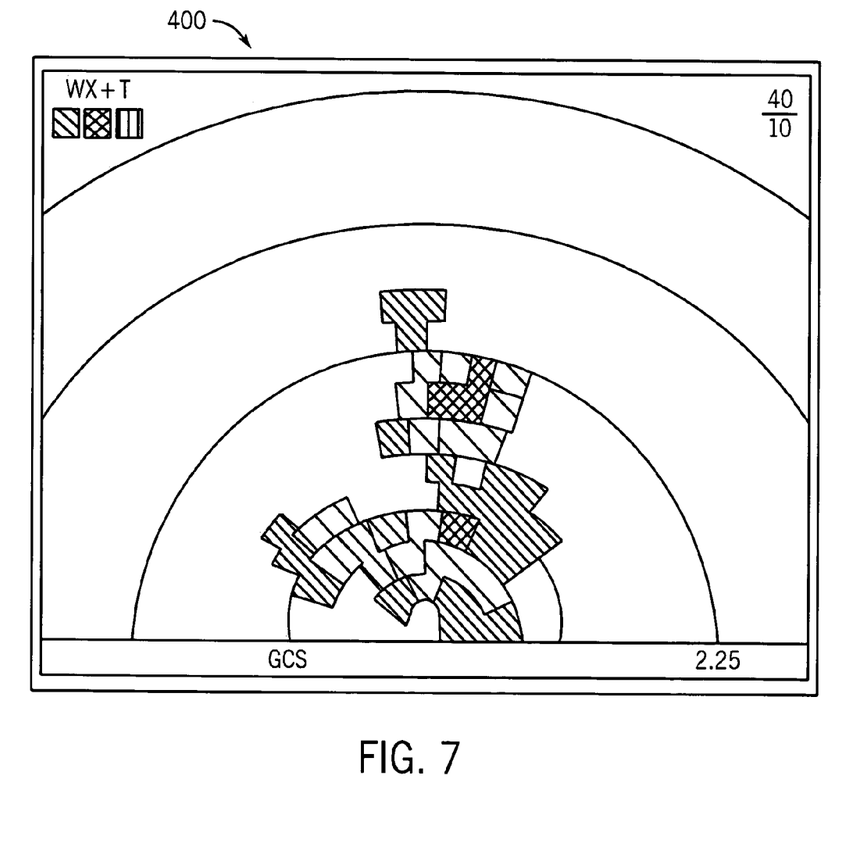
FIG. 7 is a screen shot displaying the compressed data from any of the systems of FIGS. 2-4, the compressed data is generated from turbulence data.

With reference to FIG. 7, screen shot 400 is provided using compressed data from compression circuit 140 based upon the radar data associated with screen shot 200. The compressed data is preferably generated utilizing the average plus 2 sigma algorithm to combine pixels into reduced spatial areas. Like screen shot 300, screen shot 400 includes 16 color levels utilizing colors green, yellow and red shaded to correspond to turbulence levels. Shading graduations are used to show higher data resolution. (FIGS. 6 and 7 have a greater number of cross-hatching types than FIG. 5 to depict the increased number of color levels). Screen shot 400 shows turbulence intensity only. This is an example of where a single bit of data encoded into the ARINC 453 stream is expanded into 4 bits of stored data for use in post processing environment.

As shown in FIG. 7, screen shot 400 shows substantial similarity due to the full resolution data except turbulence detection area is well under the threshold of full resolution display can be shown due to increase in data resolution from 3 to 4 bits. Screen shot 200 requires approximately 140,000 bytes to store the 3 bit ARINC 453 data stream. Screen shots 300 and 400 were created from data comprised of less than 300 bytes each. High intensity areas in screen shot 400 correspond to magenta area in screen shot 200.

Figure 3:
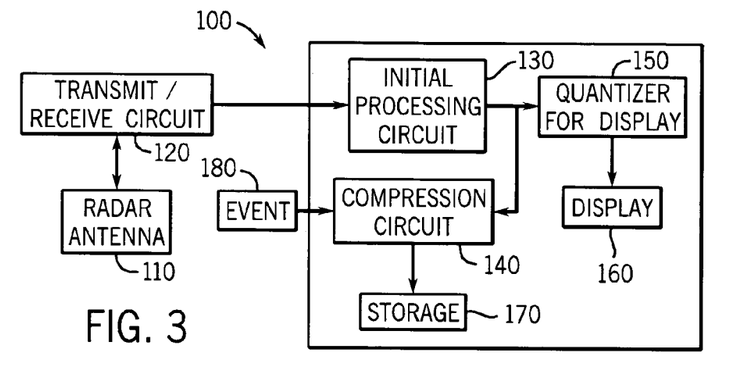
FIG. 3 is a general block diagram of another weather radar system in accordance with a second exemplary embodiment.

With reference to FIG. 3, system 100 is substantially similar to system 100 described with reference to FIG. 2. However, compression circuit 140 receives radar data between initial processing circuit 130 and quantizer circuit 150. Preferably, compression circuit 140 is customized to receive data from initial processing circuit 130.

Figure 4:
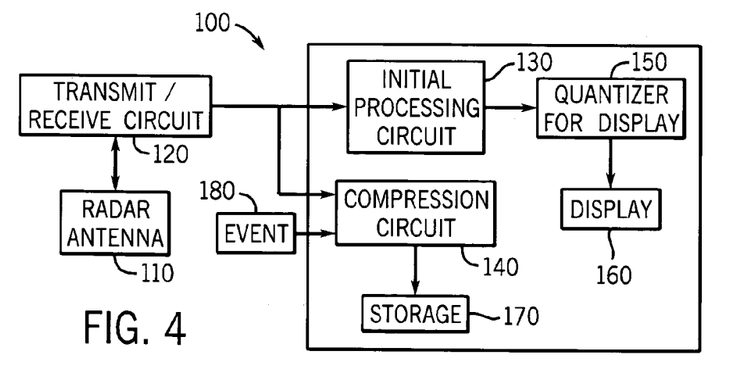
FIG. 4 is a general block diagram of yet another weather radar system in accordance with a third exemplary embodiment.

In FIG. 4, compression circuit 140 is receiving raw, digitized data from the antenna receiver or circuit 120. This data typically contains return signal magnitude information as well as phase difference between transmitted and return signals. It is commonly called IQ data. (I means In-Phase and Q means Quadrature). These are the Cartesian coordinates of the vector corresponding to the magnitude and phase described previously.

FIG. 3 shows compression circuit 140 monitoring the output of initial processing circuit 130. Initial processing circuit 130 processes the IQ data and generates information for weather range, weather intensity, weather velocity, and weather turbulence. This information is combined, filtered, and processed in internal memory storage at high resolution. The high resolution data is provided to quantizer for display 150. Any of these intermediate products is a candidate for data compression.

FIG. 4 shows compression circuit 140 monitoring the ARINC 453 output. At this point the data stream contains decimated information corresponding to 8 possible colors (5 are commonly used, i.e. black, green, yellow, red, and magenta) to represent weather intensity and presence of turbulence.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of compressing data in an aircraft weather radar system, the method comprising:
   receiving an indication of an event in the aircraft weather radar system;
   compressing weather radar data associated with graphical images provided on a weather radar display, the weather radar data being in response to weather radar returns, the compressing forming compressed data; and
   storing the compressed data, wherein the compressing step utilizes an algorithm based upon an array of blocks, wherein the blocks each have an approximately equal area, wherein the array is representative of a span of radials.

2. The method of claim 1, wherein the span is zero up to 180 degrees.

3. The method of claim 1, wherein the compressing provides greater data resolution per data point than the graphical images and the method further comprises providing the compressed data to a pilot.

4. A method of compressing data for a weather radar display system, the method comprising:
   receiving first data on an aircraft used to provide graphical images associated with graphical data to be displayed on a display of the weather radar system, the first data representing radar returns at areas or volumes, wherein the first data represents the graphical images actually displayed on the display; and
   grouping selected areas or volumes together and performing at least an averaging function on the aircraft to provide second data, the second data being compressed at a ratio of at least 2:1 when compared to the graphical data, wherein the second data is formed by taking an average of the data in each group and adding a value for standard deviation.

5. The method of claim 4, wherein the second data is compressed at a ratio of approximately 500:1.

6. The method of claim 4, wherein the groups each have an approximately equal area or volume.

7. The method of claim 4, wherein the second data is provided in response to an event and a) stored in the weather radar system in non-volatile memory or b) downloaded from an aircraft or c) downlinked from the aircraft, the weather radar system being disposed in the aircraft.

8. The method of claim 4, wherein the groups are arranged in a semicircular array.

9. The method of claim 4, wherein the second data has greater data resolution than the first data.

* * * * *